UNITED STATES PATENT OFFICE.

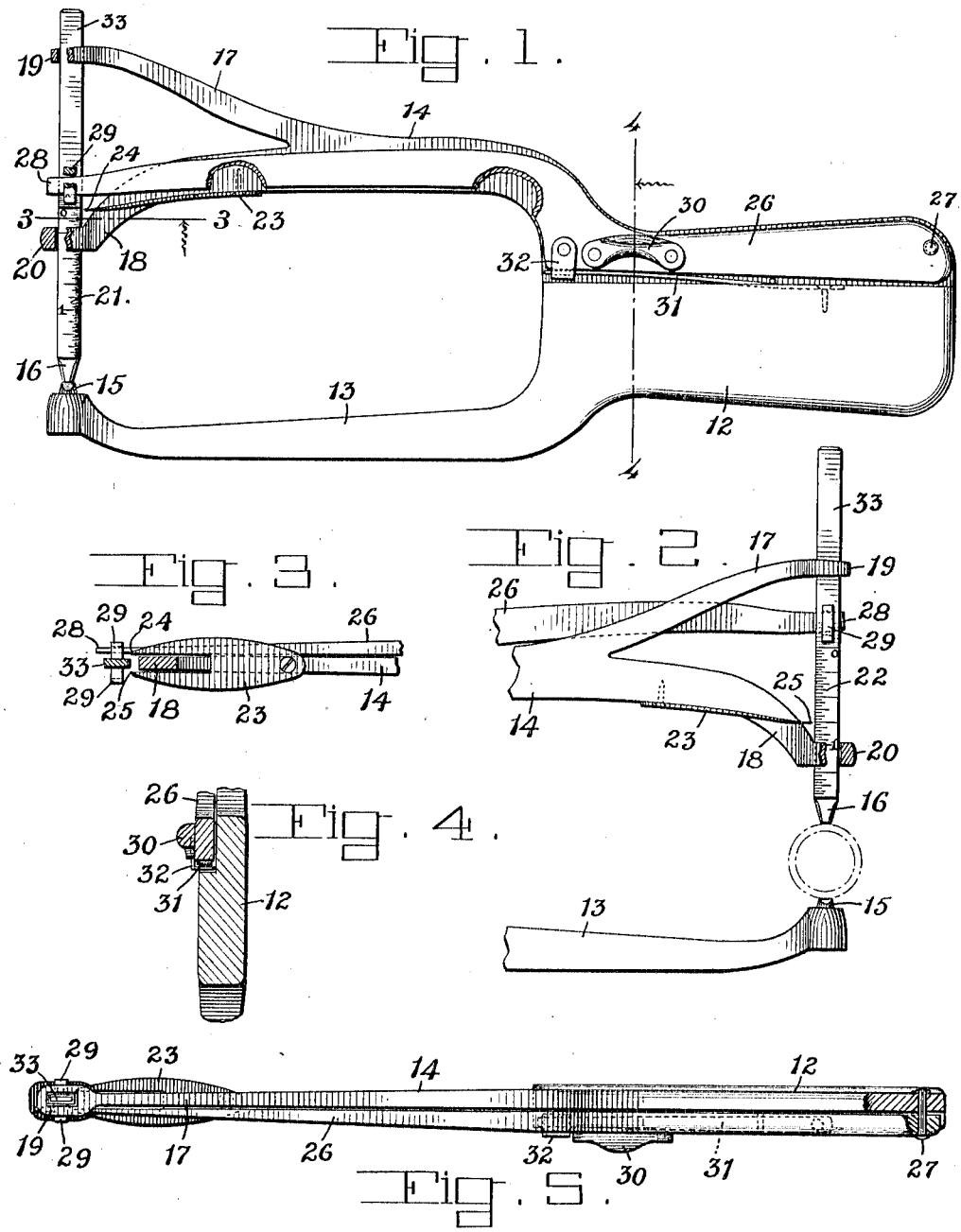

WILLIAM J. LUCAS, OF FRESNO, CALIFORNIA.

CALIPERS.

1,096,439.  Specification of Letters Patent.  Patented May 12, 1914.

Application filed March 10, 1913.  Serial No. 753,251.

*To all whom it may concern:*

Be it known that I, WILLIAM J. LUCAS, a citizen of the United States, residing at Fresno, in the county of Fresno and State of California, have invented or discovered certain new and useful Improvements in Calipers, of which the following is a specification, reference being had therein to the accompanying drawings.
This invention relates to calipers and the like and has for its objects to provide an instrument of this character which will be of durable construction and wide adaptability, which may be conveniently manipulated to measure an object by the use of one hand only, which will automatically adjust itself in accordance with the thickness of such object at the point of measurement, which will automatically indicate said thickness with absolute accuracy, and from which the dimension so indicated may be instantly read without changing the position of the instrument in the hand of the operator. These and other objects of the invention, together with means whereby the same may be carried into effect, will best be understood from the following description of one form or embodiment thereof illustrated in the accompanying drawings. It will be understood however that the construction described and shown has been chosen for illustrative purposes merely, and that the invention may be embodied in other forms without departing from the spirit and scope thereof.

In said drawings: Figure 1 is a plan view of the instrument with parts broken away and showing the measuring jaws closed; Fig. 2 is an enlarged plan view, looking from the side opposite that shown in Fig. 1, of the measuring jaws, showing said jaws partly open to measure the diameter of an object located therebetween; Fig. 3 is a section on the line 3—3, Fig. 1; Fig. 4 is a section on the line 4—4, Fig. 1; Fig. 5 is a side view looking from the top in Fig. 1.

The instrument comprises a body consisting of a handle 12 and a pair of rigid or relatively fixed arms 13 and 14 preferably formed integral with said handle. The opposed measuring jaws or contact members comprise a stationary jaw or member 15, in the form of bluntly pointed lug or stud projecting inwardly from the end of the arm 13, and a movable jaw or member 16 formed by the bluntly pointed end of a slide 33 guided for rectilinear movement in the arm 14. The arm 14 is preferably bifurcated at its end to provide two branches 17 and 18 carrying at their extremities guides 19 and 20 respectively for the slide 33. The slide 33 is provided on its opposite sides with scales 21 and 22 which may, if desired, be graduated differently for convenience in making measurements of different characters.

23 denotes a pointer secured to the arm 14 and having a forked end embracing the branch 18 of said arm, the branches of said end terminating in points 24 and 25 which coöperate with the scales 21 and 22 respectively. The relative position of the jaws 15 and 16 is indicated at all times by the points 24 and 25 upon the scales 21 and 22, and the thickness of an article to be measured may be conveniently and instantly read on said scales at the moment of bringing the jaws into engagement with the opposite sides of said article.

For adjusting or moving the slide 33 with its jaw 16 relatively to the jaw 15 there is provided a movable operating arm 26 having one end pivoted at 27 to the outer end of the handle 12, lying normally within the edges thereof, and having its opposite end 28 in direct, longitudinally slidable engagement with a stirrup 29 on the slide 33. Preferably and as herein shown two stirrups 29 are provided on opposite sides of the slide 33, said stirrups being each adapted to be engaged by the end of the operating arm, in order to permit said slide to be used with either scale adjacent said operating arm. The arm 26 is conveniently operated, when the handle 12 is grasped in the hand, by means of a thumb piece 30 secured thereto between the ends thereof and adjacent said handle, and is normally held in a position to close the jaws by means of a leaf spring 31 secured at one end to the handle 12 and engaging at its free end a stirrup 32 on the arm 26.

In operation the handle 12 of the instrument is grasped in the hand of the operator who engages with his thumb the thumb piece 30, thereby swinging the arm 26 upon its pivot 27 and moving the slide 33 so as to open the jaws a sufficient distance to permit the article to be measured to be introduced therebetween. The thumb piece 30 is then released, whereupon the spring 31 will swing the arm 26 upon its pivot to close the jaws upon said article, the thickness of which is immediately indicated by the points 24 and 25 upon the scales 21 and 22.

The instrument herein described, while capable of use for any purpose to which a caliper or like device may be put, is particularly useful for the purpose of determining the thickness at various points of an article of varying thickness, for example, for the purpose of graduating the thickness of the top or back of a violin, said thickness varying at different points. When so used the article to be measured is placed between the jaws and the instrument moved thereover, the spring 31 holding the jaws in contact with the opposite sides of the article with a substantially constant pressure, and the scales and pointers indicating the thickness at each point. In this manner also the maximum or minimum thickness of an irregular object can be readily ascertained by moving the jaws over said object with the arm 26 free and under the influence of the spring 31 and observing the scales and pointers during such movement.

In the drawings the instrument is illustrated as adapted for use by a right handed person, it being obvious, however that by arranging the arm 26 at the opposite side of the handle 12 the device would be operable with equal convenience by a left handed person.

Having thus described my invention, I claim:

1. An instrument of the character described comprising a body consisting of a handle and a pair of relatively fixed arms, a stationary jaw on one of said arms, a movable jaw on the other of said arms, and an operating arm pivoted at one end of said handle, lying normally within the edges thereof, and having its opposite end directly connected with said movable jaw for adjusting the same.

2. An instrument of the character described comprising a body consisting of a handle and a pair of relatively fixed arms, a stationary jaw on one of said arms, a movable jaw on the other of said arms, an operating arm pivoted at one end to the outer end of said handle and lying normally within the edges thereof, and having its opposite end directly connected with said movable jaw, and a thumb piece on said operating arm between the ends thereof and arranged adjacent said handle.

3. An instrument of the character described comprising a body consisting of a handle and a pair of relatively fixed arms, a stationary jaw carried on one of said arms, a slide guided for rectilinear movement on the other of said arms and constituting a movable jaw coöperating with said stationary jaw, there being a scale on said slide, a pointer on said last named arm coöperating with said scale, a stirrup carried by said slide and an operating arm pivoted to said handle and lying normally within the edge thereof, and slidably engaging said stirrup.

4. An instrument of the character described comprising a pair of relatively fixed arms, a stationary jaw on one of said arms, a slide guided on the other of said arms and constituting a movable jaw coöperating with said stationary jaw, there being scales on the opposite sides of said slide, and a pointer secured to said last named arm, said pointer having a forked end embracing said arm and the extremities of the branches of said end coöperating with said scales respectively.

In testimony whereof I affix my signature, in presence of two witnesses.

WILLIAM J. LUCAS.

Witnesses:
J. F. HAYHURST,
L. B. HAYHURST.

Copies of this patent may be obtained for five cents each, by addressing the "Commissioner of Patents, Washington, D. C."